United States Patent [19]

Merrigan

[11] 4,016,659

[45] Apr. 12, 1977

[54] FOCAL SCANNING AID

[76] Inventor: Denis F. Merrigan, 1467 Kathleen St., Newbury Park, Calif. 91320

[22] Filed: Dec. 29, 1975

[21] Appl. No.: 644,711

[52] U.S. Cl. .................................. 35/35 B; 40/352
[51] Int. Cl.² ...................................... G09B 17/04
[58] Field of Search ............. 35/35 B, 9 E; 40/341, 40/352

[56] References Cited

UNITED STATES PATENTS

| | | |
|---|---|---|
| 140,135 | 6/1873 | Hildreth ........................ 35/9 E UX |
| 2,996,812 | 8/1961 | Hamilton ........................... 35/35 B |
| 3,408,977 | 11/1968 | Colman ....................... 35/35 B UX |
| 3,704,533 | 12/1972 | Weber .............................. 35/35 B |

FOREIGN PATENTS OR APPLICATIONS 219,881  8/1924  United Kingdom ................ 35/35 B Primary Examiner—William H. Grieb
Attorney, Agent, or Firm—Allan M. Shapiro

[57] ABSTRACT

Mat of thin material has an aperture therein to limit the visible area of printed material to be read to aid in the development of good reading habits by controlling the focal scanning area. Set of focal scanning aids has progressively larger apertures to train the eye to scan areas.

2 Claims, 3 Drawing Figures

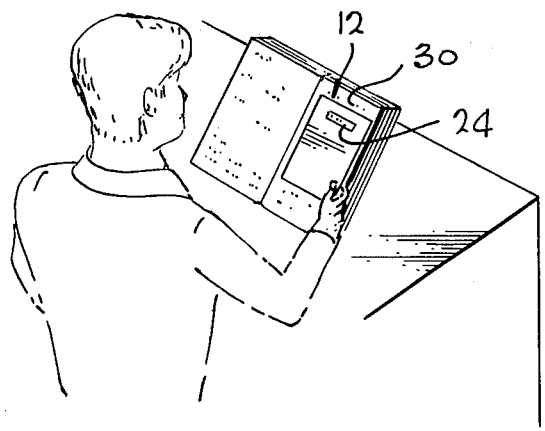
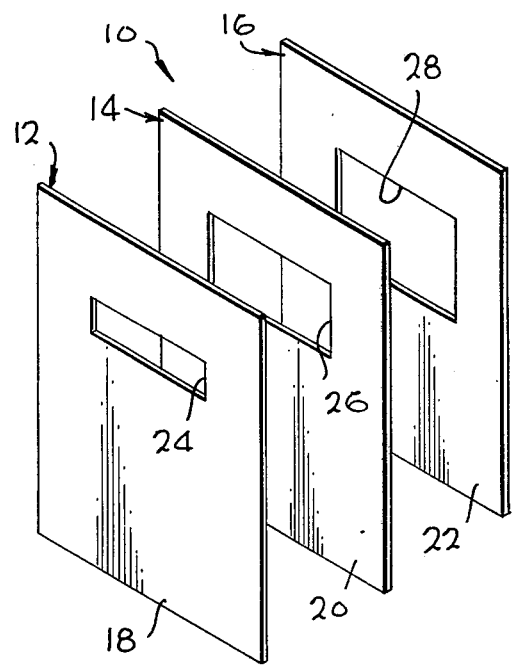
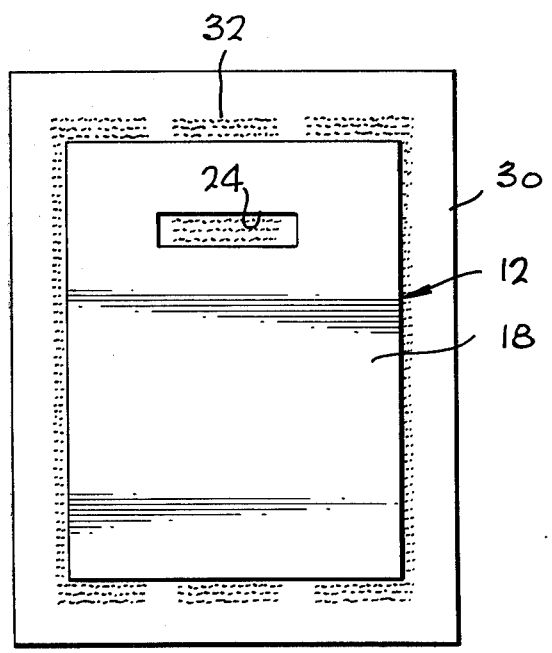

FOCAL SCANNING AID

BACKGROUND OF THE INVENTION

1. Field of the Invention

This invention is directed to a system of focal scanning aids which help the reader in training his eye motion and reading habits to maximize comprehension and speed.

2. Description of the Prior Art

Many studies have been made which indicate that maximum input of knowledge from written material is achieved by controlled eye scanning where the eye scans a single column of printed material and scans a plurality of lines at a time. This invention is directed to an aid which trains the eye and mind to operate in that manner to maximize the rate of information received.

SUMMARY OF THE INVENTION

In order to aid in the understanding of this invention, it can be stated in essentially summary form that it is directed to a substantially opaque focal scanning aid which has an aperture therein as wide as a column of printed material and has a height sufficient to control the area scanned by the eye and comprehended in one scanning pass by the eye.

It is thus an object of this invention to provide a focal scanning aid which trains the eye and the mind to scan printed material for optimum receipt of information by reading out the printed material exposed in the aperture. It is another object to provide a set of focal scanning aids having increasingly larger apertures so that, as the training of the eye and mind proceeds, larger scanning areas can be achieved. It is a further object of this invention to provide an inexpensive and convenient focal scanning aid which can be economically purchased by the individual and widely used so that comprehension training can proceed.

The features of the present invention which are believed to be novel are set forth with particularity in the appended claims. The present invention, both as to its organization and manner of operation, and together with further objects and advantages thereof, may be understood by reference to the following description taken in conjunction with the accompanying drawings.

BRIEF DESCRIPTION OF THE DRAWINGS

FIG. 1 is a perspective view showing a reader employing the focal scanning aid of this invention as he reads a book.

FIG. 2 is an isometric view of a set of focal scanning aids in accordance with this invention.

FIG. 3 is a plan view showing one of the focal aids of FIG. 2 employed in connection with a printed page.

DESCRIPTION OF THE PREFERRED EMBODIMENT

Set 10 of focal scanning aids 12, 14 and 16 is shown in FIG. 2. The focal scanning aids 12, 14 and 16 respectively comprise mats 18, 20 and 22 which carry apertures 24, 26 and 28.

The mats are of rectangular shape and are of a convenient size to cover a larger area than is normally scanned during reading of the printed page. The mats are conveniently 4 inches wide by 6 inches high and can be made from cardboard or synthetic polymer composition material in sheet form. The color of mats 18, 20 and 22 is preferably black to provide maximum contrast to the predominantly white color of the usual printed page. The finish is preferably matte to prevent distracting light reflection during use.

Apertures 24, 26 and 28 are of progressively larger size. Aperture 24 is 2½ inches wide by 7/16 inch high; while aperture 26 is 2½ inches wide by 13/16 inch high; and aperture 28 is 2½ inches wide by 1⅛ inches high. As is seen in FIG. 2, the width direction of the aperture is in the 4 inch wide direction of the mats. They are preferably 1½ inches from the top of each mat.

The focal scanning system utilizes three focal scanning mats 12, 14 and 16 with different size apertures to progressively accustom the eyes to a method of fast reading called focal scanning. This is simply achieved by holding the bottom right-hand corner of the scanning mat between the index finger and thumb while moving the flexible mat flat on the surface of the subject matter while moving vertically down a printed column of type at a speed relative to the individual's particular requirements; i.e., viewing speed adaptability and visual comprehension. FIGS. 1 and 3 show the focal scanning aid 12 (the first focal scanning aid in the set 10) in use. The focal scanning aid 12 is placed on a printed page 30 so that aperture 24 exposes a portion of the column of printed material 32. Focal scanning aid 12 is the aid in the set which has the smallest aperture which provides a smaller angle of scan which accustoms the eye to a small regulated viewing area. Mat 12 has an angled scanning aperture which accustoms the eyes to a small regulated viewing area of three printed lines of type with a column width of less than 2½ inches. Due to its minimal exposure, it is ideal to begin conditioning the eyes to this fast reading process. Due to the minimum exposure area, viewing and comprehension are achieved in the shortest possible time. The user places the scanning aid on the page, exposing a portion of the printed material, and scans with one scanning pass from the left and right all that is exposed. The reader learns to achieve comprehension of this material in one scanning pass. With each pass, he manually moves mat 18 downward so that aperture 24 exposes new material. When the eyes become accustomed to the controlled scanning of the subject matter provided by the focal scanning mat 12 so that the reader learns to quickly and accurately comprehend the subject matter scanned in a single pass through aperture 24, then he uses focal scanning aid 14.

Focal scanning aid 14 is used in the same manner, but its double size aperture 26 provides a larger area of information, six printed lines of type, to be scanned in a single pass, and thus practice is necessary to achieve rapid comprehension. When that is achieved, the reader changes to focal scanning aid 18 with its still larger aperture 28. This focal scanning aid has the largest viewing area which the eye seems to be able to scan in a single pass and achieve reasonable comprehension. By the progressive use of the focal scanning aids 12, 14 and 16, the eye is finally trained to concentrate automatically on a proper size area of information for a single scanning pass and thus is able to move down a column of reading material at a relatively high rate of speed with reasonable comprehension. The focal scanning aids 12, 14 and 16 are not intended to be used as a permanent reading aid, but used with a training method to accustom the eyes and mind to reading and comprehending a group of material represented by a plurality of lines of printed material. In this way, improved reading habits are achieved.

The focal scanning system expands visual comprehension by a series of controlled steps that train the eyes to scan an area of subject matter while moving vertically down in a column of printed matter. Unlike the old slow method of reading from left to right, word by word, the focal scanning system utilizes the unique capabilities of the human eye. When we look out of a window at a view of a meadow, we immediately take in all detail. Instantaneously, we see the trees, grass, flowers, rock, sky, and so forth, i.e., a complete panoramic picture, and the mind instantly computes all impressions which are comprehended and is instantly committed to the individual's memory. In focal scanning, we utilize just a fraction of this unique system by requiring the eyes to focus on a small area of print at a relative rate of speed. The majority of magazine printed material has reading columns of 2¼ inches in width. It is this general material that the focal scanning system utilizes as teaching material. The system is so designed to teach the individual initially to increase his speed while still maintaining full comprehension of the subject matter, thereby increasing his reading capabilities. The system was not intended to be a permanent teaching aid, but to be used until the individual has learned the technique of focal scanning. The focal scanning system disclosed is simple and portable, unlike most speed reading courses which are costly and time-consuming. The focal system can be used anywhere in the manner one uses the daily newspaper and at a fraction of the cost of present existing systems. Its possibilities for general school use, and also as a complement to existing speed reading systems are recognizable. Die stamped from sheet plastic, the focal mats are easily produced by low cost, mass production techniques. The system, sold in kit form consisting of three focal mats and printed instructions in a plastic holder, would fit either purse or pocket comfortably. In tests with several individuals, it was found that exposure of 6 to 12 hours gave the individual both speed and comprehension well above his usual reading habits. This is a relative situation and varies somewhat with different individuals.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A focal scanning aid comprising:
   a set of first, second and third mats, each of said mats being of sufficient size to cover at least a portion of a printed page, each of said mats being of substantially rectangular shape and having a substantially black matte surface thereon;
   first, second and third rectangular apertures respectively in said first, second and third mats, said first, second and third apertures each having substantially the same width which is sufficient to expose a full column width of printed material;
   said first aperture in said first mat being of such height that an unskilled reader can scan three lines of printed material exposed therethrough in a single scan pass, said second aperture in said second mat having a greater height so that a more skilled reader can scan six lines of printed material exposed therethrough in a single pass, and said third aperture in said third mat being of greater height than said second aperture and being of such height that only a reader of near maximum reading skills can scan printed material exposed therethrough in a single scan pass so that said focal scanning aid progressively trains readers to scan larger quantities of material.

2. The focal scanning aid of claim 1 wherein said first, second and third rectangular apertures are each substantially the same distance from the top of said first, second and third mats.

* * * * *